(12) United States Patent
King

(10) Patent No.: US 6,425,543 B1
(45) Date of Patent: Jul. 30, 2002

(54) CORD HOLDER

(76) Inventor: Michael R. King, 3655 Blaisdell Ave. S., Minneapolis, MN (US) 55409

( * ) Notice: Subject to any disclaimer, the term of this patent is extended or adjusted under 35 U.S.C. 154(b) by 0 days.

(21) Appl. No.: 09/753,534

(22) Filed: Jan. 2, 2001

(51) Int. Cl.⁷ .............................................. B65H 75/38
(52) U.S. Cl. .................................................. 242/405.2
(58) Field of Search ............................. 242/388, 388.1, 242/405, 405.1, 613.3, 405.2, 407; 191/12 R, 12.2 R; 206/409, 702

(56) References Cited

U.S. PATENT DOCUMENTS

| | | | | |
|---|---|---|---|---|
| 1,178,056 A | * | 4/1916 | Craig | 242/405.1 |
| 2,470,212 A | * | 5/1949 | Carlson | 242/405.1 |
| 2,472,300 A | * | 6/1949 | Kemplin | 242/405.1 |
| 2,532,394 A | * | 12/1950 | D'Amico | 242/405.1 |
| 2,590,695 A | * | 3/1952 | Gomberg | 242/405.1 |
| 2,626,762 A | * | 1/1953 | Zick | 242/405.1 |
| 3,042,337 A | * | 7/1962 | Dinneen | 242/405 |
| 3,803,650 A | * | 4/1974 | D'Amico | 242/613.3 |
| 3,934,838 A | * | 1/1976 | D'Amico | 242/405.1 |
| 4,177,961 A | | 12/1979 | Gruenewald | |
| 4,779,815 A | * | 10/1988 | Moore et al. | 242/405.1 |
| 5,924,643 A | * | 7/1999 | Campana | 242/405.1 |

* cited by examiner

Primary Examiner—William A. Rivera
(74) Attorney, Agent, or Firm—Jacobson & Johnson

(57) ABSTRACT

A cord holder having a body member with cord retaining regions on each end with the body member having a temporally securable closure member on each end to allow quick passage of a cord into the cord retaining regions with the securable closure members securable to each other to hold the cord on the body member.

16 Claims, 2 Drawing Sheets

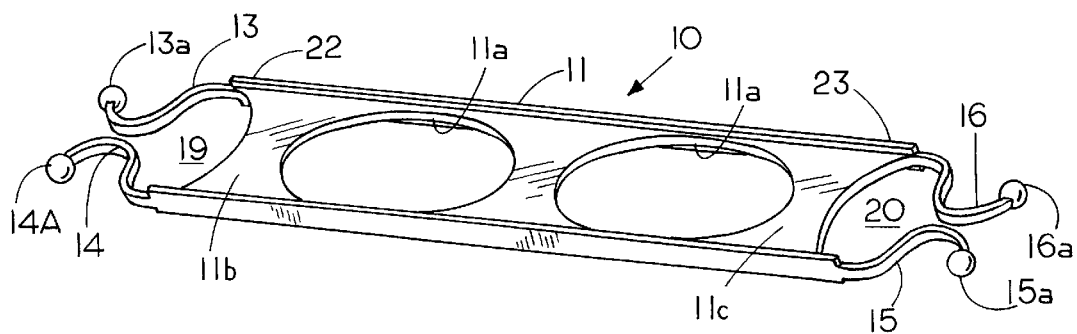
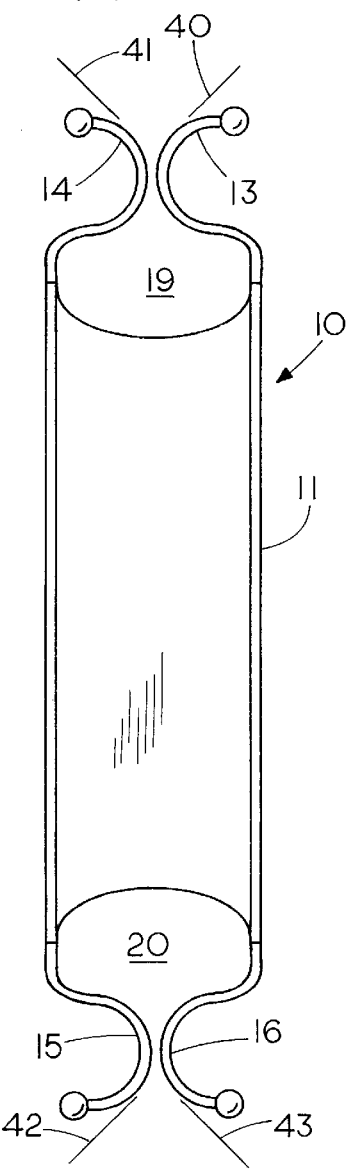
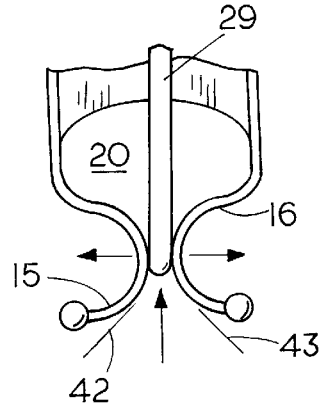
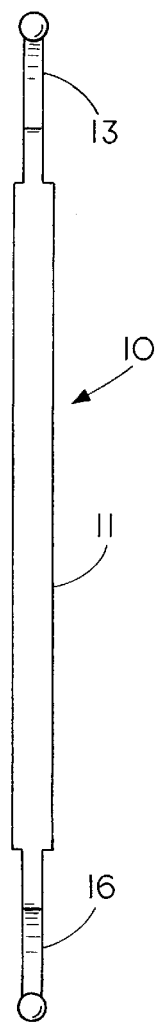
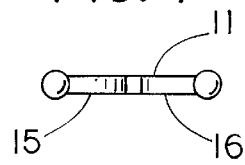

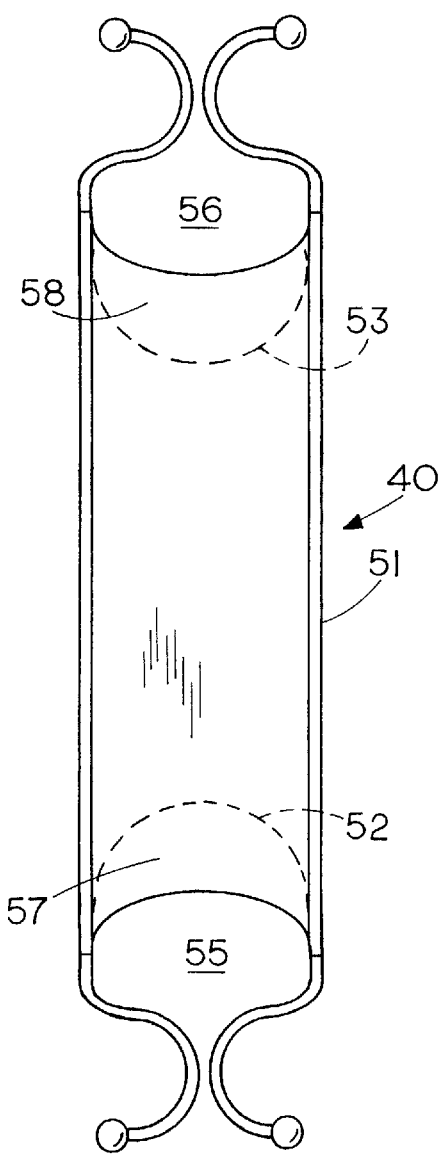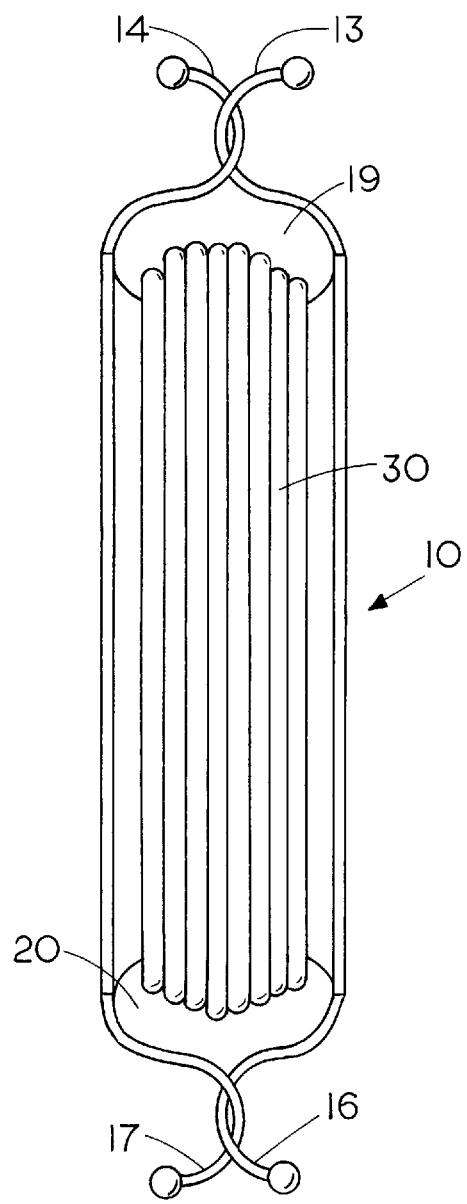

CORD HOLDER

FIELD OF THE INVENTION

This invention relates to cord holders and more specifically to improvements to cord holders that allows a user to wrap a cord around the cord holder as securable closure members on the end of the cord holder flex apart to allow the cord to be wound around the cord holder.

BACKGROUND OF THE INVENTION

The concept of cord holders for electrical cords is known in the art. Typically, the cord holders comprise an elongated member having an open ended U-shaped recesses on each end of the cord holder for preventing a cord from falling off the cord holder. Generally, the end of cord is secured to some type of clip to prevent the cord from unwinding. Typical of such prior art cord holders is shown in U.S. Pat. No. 4,123,012 which discloses a cord holder with side clips for holding the end of the cord in position. One of the difficulties with such cord holders is that invariably the end of the cord cannot be hooked into the clip either because the length of the unwound cord is either to long or too short. Consequently, as a result the cord is likely to unwind or at least partially unwind during the handling of the cord holder.

While means such as cable ties are known in the art and are used to hold a plurality of wires cables in a bundle. The cable ties are tied at spaced intervals along the length of a plurality of wires or cables to hold the multiple wires or cables as a single cable. As cable ties are for holding wires in a group they are not suitable for temporarily storing extension cords, such as computer cords. An example of a cable tie, which is used to bundle wires is sold under the tradename Flip-Clip™ by Avery Dennison.

One of the methods of preventing a cord from unwinding on a cord holder involves the application of electrical tape around the end of the cord and a portion of the cord holder to maintain the cord on the cord holder. With the present invention no additional fasteners are required since the closure members are permanently attached or are integral to the cord connector to always be in a ready condition for maintaining a cord on the cord holder.

The present invention provides an improved cord holder wherein a cord can be temporarily stored by winding the cord around a body member which includes securable closure members on each end that even though they remain on the end of the cord holder they do not hinder the winding of the cord but instead form a guide surface for guiding the cord into the cord retaining regions of the core holder. That is, the legs on the closure members flex and separate in response to the winding pressure of the cord to allow the cord to slide pass the closure members and be wrapped around the body of the cord holder. Once the cord is wound on the cord holder the user does not need to search for electrical tape or the like to secure the cord since the securable closure members are in a ready condition for the user to quickly secure the loose end of the cord in a retained position on the cord holder and thereby prevent the accidental unwinding of the cord during subsequent handling of the cord holder.

SUMMARY OF THE INVENTION

A cord holder having a body member with cord retaining regions on each end with the body member having a securable closure member on each end to allow quick passage of a cord into the cord retaining regions with the closure members including legs fixedly securable to each other to hold the cord on the body member and prevent the accidental unwinding of the cord from the cord holder.

BRIEF DESCRIPTION OF THE DRAWINGS

FIG. 1 is a perspective view of the cord holder of the present invention;

FIG. 2 is a front or back view of the cord holder for wrapping a cord thereon;

FIG. 2a is a partial front view of the cord holder showing the flexing of the closure members to allow a cord to be wrapped around the cord holder;

FIG. 3 is a left side or right side view of the cord holder of FIG. 2;

FIG. 4 is a top or bottom view of the cord holder of FIG. 2;

FIG. 5 is a front view of an alternate embodiment of the cord holder of FIG. 2; and FIG. 6 is a front view of the cord holder of FIG. 2 with the closure members maintaining a wound cord therein.

DESCRIPTION OF THE PREFERRED EMBODIMENT

FIG. 1 shows a perspective view of an integral, one-piece cord holder 10 for storing electrical and computer cords. Cord holder 10 includes an elongated body member 11 having a pair of relief areas 11a therein. Relief areas 11a are optional as seen in the embodiments of FIGS. 2 to 6. The body member 11 has a first end 22 and a second end 23.

Located on first end 22 is a first fixedly securable closure member comprising a first elongated leg 14 that terminates in protrusion or knob 14a and a second elongated leg 13 that terminates in protrusion or knob 13a Each of the legs 13 and 14 are made from a flexible and resilient material such as nylon or the like that allows the legs to flex and bend in response to finger pressure. In the embodiment shown the legs are integral to the body member 11; however, if desired the legs 13 and 14 could be separately secured to body member 11 and made from material different from body member 11. The leg 13 and leg 14 together with body member end 11b coact to define a first cord retaining region 19 on one end of body member 11.

Similarly, located on second end 23 is a second fixedly securable closure member comprising a first elongated leg 15 that terminates in a protrusion or knob 15a and a second elongated leg 16 that terminates in a protrusion or knob 16a. Each of the legs 15 and 16 are made from a flexible and resilient material such as nylon or the like that allows the legs to flex and bend in response to finger pressure. In the embodiment shown the legs are integral to the body member 11 however, if desired the legs 15 and 16 could also be separately secured to body member 11 and preferably are identical to the legs 13 and 14. The leg 15 and leg 16 together with body member end 11c coact to define a second cord retaining region 20 in the opposite end of body member 11.

FIG. 2 is a front or back view of the cord holder 10 for wrapping a cord thereon without out the relief areas 11a shown in FIG. 1. To illustrate the cord guiding feature provide by closure member legs 13 and 14 as well as closure member legs 15 and 16, a set of converging lines 40 and 41 have been sketched with the apex of the lines terminating in the region between legs 13 and 14. Similarly, a set of converging lines 42 and 43 extend into the region between legs 15 and 16 with the apex of the lines remaining in the region between legs 15 and 15. As evident from FIG. 2 the legs, which are in a normally closed but unsecured position, prior to winding a cord on the cord holder 10 would appear to provide an obstruction to winding a cord on the cord holder 10. The legs 13 and 14 and the legs 15 and 16 project outward from the cord holder 10 but are held proximate each other. With the legs projecting outward it forms a cord guide to assist in directing a cord into the cord retaining regions as the cord is wound on the cord holder. Thus, even though there is an obstruction over the ends the alignment of the legs minimizes the snagging of the cords on the closure members as the cord is wound around the cord holder 10. Of course, if desired one could form the legs so that one could fold or bend them out of the way during the cord winding process.

FIG. 2a is a partial front view of the cord holder 10 showing the outward flexing of the legs 15 and 16 to allow a cord 29 to pass therebetween. That is, the normal winding force generated when winding the cord around the body member 11 cause the legs 15 and 16 to flex outwardly allowing the cord 29 to allow the cord slip therepast and into the cord retaining region 20. Thus, a feature of the invention is that the closure members while proximate to each other do not hinder the wrapping of cord 29 around the cord holder. In fact, they can act as a guide to direct the cord into the core retaining region as evident by the converging of lines 42 and 43 which are drawn tangent to the interior of legs 15 and 16 and indicated a guided path for the cord to follow as it is wound on the cord holder.

To illustrate the securement of a cord in the cord holder reference should be made to FIG. 6 which shows a cord wrapped around cord holder 10 with each of the closure members 13 and 14 fixedly secured to each other as well as the closure members 15 and 16. The fixedly securing of securable closure members allow a user to secure the windings of the cord in the cord retaining region 19 and the cord retaining region 20 without fear that the cord will accidentally unwind.

Referring to FIG. 5 reference numeral 40 identifies an alternate embodiment of the present invention wherein the closure members on each end of the body member 41 are identical to the closure members on cord holder 10. Cord holder 40 differs from cord holder 10 in that on each end there is provided a weakened region identified by reference number 52 and 53. The weakened region 52 allows a knockout section 57 to be removed from body member by flexing on knock out section 57. Similarly, the weakened region 53 allows a knockout section 58 to be removed from the body member 41 to thereby enlarge the cord retaining region 56. Thus with the present invention a user can wrap a cord around the cord holder and twist the legs to secure the cord on the cord holder. However, if the amount of cord is to large the user can merely enlarge the cord retaining regions by removing the knockouts 57 and 58. Thus a user can be assured that the closure members can be used to secure the cord in a tight roll whether the cord has few or many windings on the body of the cord holder.

The present invention includes the method of temporarily storing a cord comprising the steps of: 1. winding a cord around a body member 11; 2. flexing a closure member apart by the pressure of the winding cord to allow the cord to enter a cord retaining region; 3. continuing to wind the cord until a loose end remains; and 4. securing the cord against the body member by closing the securable closure members.

In order to secure the cord in place on the cord holder the method includes the step of twisting the closure member to fixedly secure or lock the cord in position in the cord retaining regions 19 and 20.

If the amount of cord is to large for the retaining region a user can enlarge the cord retaining region by removing knockouts 57 and 58 on the body member 51 to enlarge the cord retaining regions 55 and 56.

In order to prevent the cords from falling off the cord holder during handling the method includes fixedly securing a closure member on each end of the body member to prevent the cord from unwinding from the cord holder.

It is evident that with the present invention a low cost, one-piece, cord holder can be made which can securely hold a cord in a retained position on the cord holder so that the cord does not become accidentally unwound during handling.

In addition, the cord holder can be used to store excess lengths of cords on equipment that is in use, which allows a person to avoid the tangling of cords.

I claim:

1. A cord holder comprising:
   a body member, said body member having a first end and a second end;
   a first securable closure member, said first securable closure member having a first resilient strip and a second resilient strip that can be twisted in to latching engagement with each other, said first securable closure member located on said first end of said body member with said first securable closure member and said first end of said body member coacting to define a first closed cord retainer region; and
   a second securable closure member, said second securable closure member located on said second end of said body member with said second securable closure member and said second end of said body member coacting to define a second closed cord retainer region with said first securable closure member and said second securable closure member temporarily separable to allow a cord to be wrapped around said body member for cord storage, said first securable closure member and said second securable closure member fixedly securable to prevent a cord from accidentally falling off said cord holder.

2. The cord holder of claim 1 wherein the cord holder comprises a one piece cord holder.

3. The cord holder of claim 1 wherein the body member includes a knockout to enlarge the first cord retainer region and the second cord retaining region.

4. The cord holder of claim 1 wherein the cord holder is a polymer plastic.

5. The cord holder of claim 1 wherein the body member has an elongated shape.

6. The cord holder of claim 1 wherein the body member includes a notch therein for securing a plug end of a cord thereto.

7. The cord holder of claim 1 wherein the body member includes at least two knockouts to permit enlarging of both cord retaining regions on said cord holder.

8. The cord holder of claim 1 wherein each of the securable closures include a protuberance to prevent accidentally unlatching of said securable closures.

9. The cord holder of claim 1 wherein the first securable closure in a normally open position has a first flexible resilient leg extending from one side of the body member and a second flexible resilient leg extending from the opposite side of the body member.

10. The cord holder of claim 1 wherein an outward end of said first leg and an outward end of said second end diverge from each other to form a flexing spreadable guide for wrapping a cord around said body member.

11. The cord holder of claim 1 wherein the cord holder and the securable closure member are made from nylon.

12. The cord holder of claim 1 wherein the cord holder includes a relief area.

13. The method of temporarily storing a cord comprising the steps of:
    winding a cord around a body member;
    flexing a securable closure member apart by a pressure of the winding cord to allow the cord to enter a cord retaining region;
    continuing to wind the cord until a free end remains;
    securing the cord against the body member by closing the securable closure member; and
    twisting a pair of legs in the securable closure member to lock the cord in position.

14. The method of claim 13 including the step of removing a knockout on the body member to enlarge the cord retaining region.

15. The method of claim 13 wherein a securable closure member is closed on each end of the body member to prevent the cord from unwinding from the cord holder.

16. A one stop cord holder that a user can wind and secure a cord to the cord holder by flexing a portion of the cord holder comprising:
    a body member, said body member having a first end and a second end;
    a first securable closure member, said first securable closure member having a first resilient strip and a second resilient strip that can be twisted in to latching engagement with each other, said first securable closure member secured on said first end of said body member with said first securable closure member having a normally closed but unsecured position to allow passage of a cord therepast, said first end of said body member coacting with said first securable closure member to define a first cord retainer region; and
    a second securable closure member, said second securable closure member secured to said second end of said body member with said second securable closure member having a normally closed but unsecured position to allow passage of a cord therepast, said second end of said body member coacting to define a second cord retainer region whereby a cord can be wrapped around said body member for cord storage with the winding pressure of the cord causing the cord to slide past the normally closed but unsecured securable closure members with said first securable closure member and said second securable closure member closeable to a secured position to prevent a cord from accidentally falling off said cord holder.

* * * * *